(12) United States Patent
Li et al.

(10) Patent No.: US 8,472,450 B2
(45) Date of Patent: Jun. 25, 2013

(54) METHOD AND SYSTEM FOR ESTABLISHING TUNNELS

(75) Inventors: Zhenbin Li, Shenzhen (CN); Tieying Huang, Shenzhen (CN); Nan Meng, Shenzhen (CN); Feng Ke, Shenzhen (CN); Chun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 12/904,484

(22) Filed: Oct. 14, 2010

(65) Prior Publication Data

US 2011/0038380 A1 Feb. 17, 2011

Related U.S. Application Data

(63) Continuation of application No. PCT/CN2009/071189, filed on Apr. 8, 2009.

(30) Foreign Application Priority Data

May 8, 2008 (CN) .......................... 2008 1 0097023

(51) Int. Cl.
*H04L 12/28* (2006.01)
(52) U.S. Cl.
USPC ..................................................... 370/395.5
(58) Field of Classification Search
USPC .............. 370/351, 389, 392, 395.1, 396–397, 370/395.5–395.53, 400, 401, 464–465
See application file for complete search history.

(56) References Cited

U.S. PATENT DOCUMENTS

| | | | |
|---|---|---|---|
| 6,765,921 B1 | 7/2004 | Stacey et al. | |
| 6,965,572 B1 | 11/2005 | Boodaghians | |
| 6,978,394 B1 | 12/2005 | Charny et al. | |
| 6,985,447 B2 | 1/2006 | Gibson et al. | |
| 6,985,959 B1 | 1/2006 | Lee | |
| 7,046,669 B1 | 5/2006 | Mauger et al. | |
| 7,266,124 B2 * | 9/2007 | Kim et al. | 370/397 |
| 7,552,234 B2 | 6/2009 | Thubert et al. | |
| 8,031,674 B2 * | 10/2011 | Weniger et al. | 370/331 |

(Continued)

FOREIGN PATENT DOCUMENTS

| CN | 1745558 A | 3/2006 |
|---|---|---|
| CN | 1770718 A | 5/2006 |

(Continued)

OTHER PUBLICATIONS

International Search Report, International application No. PCT/CN2009/071189, Date of mailing of the international search report Jun. 18, 2009, 4 pages.

(Continued)

*Primary Examiner* — Frank Duong
(74) *Attorney, Agent, or Firm* — Slater & Matsil, L.L.P.

(57) ABSTRACT

A method for establishing tunnels includes establishing a first unidirectional tunnel from a first node to a second node, and sending a first instruction for establishing a reverse tunnel of the first tunnel, when sending the first instruction to the second node, triggering the establishment of a second unidirectional tunnel from the second node to the first node, and binding the second tunnel to the first tunnel as the reverse tunnel of the first tunnel. A system for establishing tunnels is also provided. The establishment of a reverse tunnel may be automatically triggered after a forward tunnel is established, and a bidirectional tunnel is established.

20 Claims, 6 Drawing Sheets

U.S. PATENT DOCUMENTS

| | | | |
|---|---|---|---|
| 2003/0149718 A1* | 8/2003 | Theimer | 709/201 |
| 2004/0202183 A1 | 10/2004 | Thubert et al. | |
| 2006/0092964 A1 | 5/2006 | Park et al. | |
| 2006/0251101 A1* | 11/2006 | Zhang et al. | 370/437 |
| 2011/0038380 A1 | 2/2011 | Li et al. | |

FOREIGN PATENT DOCUMENTS

| | | |
|---|---|---|
| CN | 101577657 B | 5/2012 |
| EP | 1 653 704 A1 | 5/2006 |
| WO | WO 01/95583 A2 | 12/2001 |
| WO | WO 2004/072807 A2 | 8/2004 |

OTHER PUBLICATIONS

Braden, R., et al., "Resource ReSerVation Protocol (RSVP)—Version 1 Message Processing Rules," Network Working Group, RFC 2209, Sep. 1997, 25 pages.

Awduche, D., et al., "RSVP-TE: Extensions to RSVP for LSP Tunnels," Network Working Group, RFC 3209, Dec. 2001, 61 pages.

Pan, P., et al., "Fast Reroute Extensions to RSVP-TE for LSP Tunnels," Network Working Group, RFC 4090, May 2005, 38 pages.

Xu, X., et al., "Bidirectional RSVP-TE Tunnel draft-xu-mpls-rsvp-te-bidirection-00.txt," L3VPN Working Group, Internet Draft, Jan. 6, 2006, 8 pages.

Braden, R., et al., "Resource ReSerVation Protocol (RSVP)—Version 1 Functional Specification," Network Working Group, RFC 2205, 100 pages.

Written Opinion of the International Searching Authority, PCT/CN2009/071189, Date of mailing: Jun. 18, 2009, 4 pages.

First Chinese Office Action, Chinese Application No. 200810097023.3, Apr. 20, 2011, 16 pages.

Lee, et al., "Exclude Routes—Extension to Resource Reservaton Protocol—Traffic Engineering (RSVP-TE)." RFC 4874, Apr. 2007, pp. 1-28.

Papadimitriou, el al., "Generalized MPLS (GMPLS) RSVP-TE Signaling Extensions in Support of Calls," RFC 4974 Aug. 2007, pp. 1-32.

Extended European Search Report received in European Application No. 09741674.7 mailed Jan. 22, 2013, 7 pages.

* cited by examiner

```
┌─────────────────────────────────────────────────────────┐
│ Establish a first unidirectional tunnel from the first node to │
│   the second node, and send the first instruction for         │
│   establishing the reverse tunnel of the first unidirectional │
│   tunnel, the path information of the first unidirectional    │─ 410
│ tunnel, and the second instruction indicating the path of the │
│   reverse tunnel of the first unidirectional tunnel during the│
│         establishment of the first unidirectional tunnel       │
└─────────────────────────────────────────────────────────┘
                              │
                              ▼
┌─────────────────────────────────────────────────────────┐
│ When the first instruction, the path information of the first │
│ unidirectional tunnel, and the second instruction are sent to │─ 420
│         the second node, trigger the establishment of a second │
│  unidirectional tunnel from the second node to the first node │
│   according to the path information of the first unidirectional│
│              tunnel and the second instruction                 │
└─────────────────────────────────────────────────────────┘
                              │
                              ▼                            ─ 430
┌─────────────────────────────────────────────────────────┐
│    Bind the second unidirectional tunnel to the first tunnel as│
│       the reverse tunnel of the first unidirectional tunnel    │
└─────────────────────────────────────────────────────────┘
```

METHOD AND SYSTEM FOR ESTABLISHING TUNNELS

This application is a continuation of co-pending International Application No. PCT/CN2009/071189, filed Apr. 8, 2009, which designated the United States and was not published in English, and which claims priority to Chinese Application No. 200810097023.3, filed May 8, 2008, both of which applications are incorporated herein by reference.

TECHNICAL FIELD

The present disclosure relates to communications technologies, and in particular to a method and system for establishing tunnels.

BACKGROUND

The Traffic Engineering (TE) tunnel may provide a reliable Quality of Service (QoS) mechanism. It guarantees the bandwidth and supports features such as affinity, explicit path, and preemption. In addition, the TE tunnel has a backup protection mechanism, such as partial protection (fast re-routing) and end-to-end protection (including hot standby protection and tunnel group protection).

Because the current TE tunnel is unidirectional, it cannot support some specific scenarios, thus failing to meet some specific requirements.

For example, when a Resource Reservation Protocol—Traffic Engineering (RSVP-TE) tunnel and a multicast service need to be deployed on a same network, the multicast function may be affected if multicast traffic is carried on the TE tunnel, that is, when multicast packets are forwarded through the TE tunnel.

Figure 1:
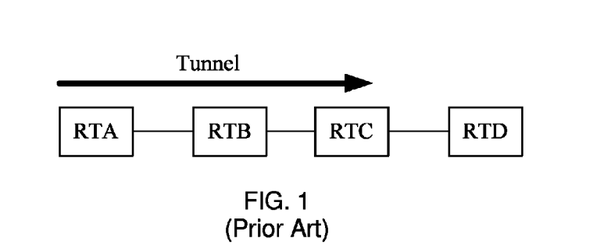
FIG. 1 is a schematic diagram illustrating a tunnel in the prior art.

As shown in FIG. 1, a forward TE tunnel is established from router A (RTA) to router C (RTC). When a multicast signaling packet is sent from RTA to RTC, the multicast signaling packet goes through the TE tunnel. Thus, router B (RTB) does not process the multicast packet, nor does it have related multicast forwarding entries. When the traffic is returned from router D (RTD) to RTA through RTC and RTB, the traffic can reach RTA only when it undergoes the IP forwarding by RTB. RTB, however, does not have multicast forwarding entries. Thus, the multicast traffic is lost.

SUMMARY OF THE INVENTION

Embodiments of the present disclosure provide a method and system for establishing tunnels.

A method for establishing tunnels in an embodiment of the present disclosure, includes establishing a first unidirectional tunnel from a first node to a second node, and sending a first instruction for establishing a reverse tunnel of the first unidirectional tunnel, when sending the first instruction to the second node, triggering the establishment of a second unidirectional tunnel from the second node to the first node, and binding the second unidirectional tunnel to the first unidirectional tunnel as the reverse tunnel of the first unidirectional tunnel.

A system for establishing tunnels in an embodiment of the present disclosure includes a first tunnel establishing unit, configured to: establish a first unidirectional tunnel from a first node to a second node, and send a first instruction for establishing a reverse tunnel of the first unidirectional tunnel, a second tunnel establishing unit, configured to trigger the establishment of a second unidirectional tunnel from the second node to the first node when the first instruction for establishing the reverse tunnel of the first unidirectional tunnel is sent to the second node, and a first binding unit, configured to bind the second unidirectional tunnel to the first unidirectional tunnel as the reverse tunnel of the first unidirectional tunnel.

In embodiments of the present disclosure, the instruction for establishing the reverse tunnel of the first unidirectional tunnel is sent during the establishment of the first unidirectional tunnel. When the instruction reaches the egress node (that is, the second node) of the first unidirectional tunnel, the establishment of the reverse tunnel of the first unidirectional tunnel is triggered. Thus, a bidirectional tunnel is established conveniently and the scenario of the tunnel technology is enriched.

DETAILED DESCRIPTION OF ILLUSTRATIVE EMBODIMENTS

A tunnel at least includes one ingress node and one egress node. In general, other nodes exist between the ingress node and the egress node. Therefore, for better description of embodiments of the present disclosure, other nodes between the ingress node and the egress node of a tunnel are called intermediate nodes, and a path formed by these intermediate nodes is called an intermediate path.

Embodiment 1

Figure 2:
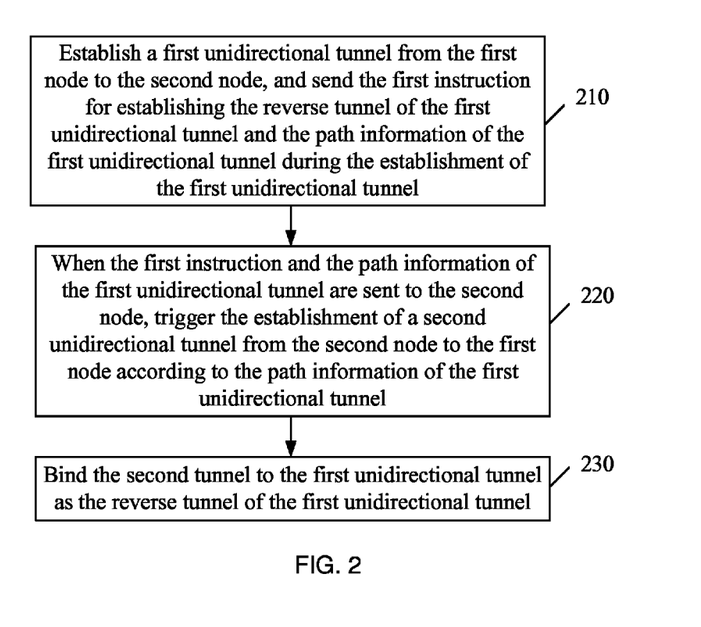
FIG. 2 is a flowchart of a method for establishing tunnels in Embodiment 1 of the present disclosure.

As shown in FIG. 2, the method for establishing tunnels in Embodiment 1 of the present disclosure includes the following steps.

Step 210: Establish a first unidirectional tunnel from the first node to the second node, and send the first instruction for establishing the reverse tunnel of the first unidirectional tunnel and the path information of the first unidirectional tunnel during the establishment of the first unidirectional tunnel.

During the establishment of a unidirectional tunnel, generally the ingress node of the tunnel sends a tunnel establishment message (for example, an RSVP-TE Path message) to the egress node of the unidirectional tunnel, where the tunnel establishment message carries path information of the first unidirectional tunnel, such as address of the ingress node and address of the egress node of the first unidirectional tunnel. In Embodiment 1, a first instruction for establishing the reverse tunnel of the first unidirectional tunnel is sent, so that the first instruction may be sent to the egress node (the second node) of the first unidirectional tunnel. The first instruction is generally sent during the establishment of the first unidirectional tunnel. The first instruction may be identified in multiple forms, for example, it may use a special ID or a special object, so long as the request for establishing the reverse tunnel can be identified from the first instruction according to a predetermined agreement.

Step 220: When the first instruction and the path information of the first unidirectional tunnel are sent to the second node, trigger the establishment of a second unidirectional tunnel from the second node to the first node according to the path information of the first unidirectional tunnel.

For example, when the first instruction is sent to the second node, a second tunnel establishment message including the path information for establishing the second unidirectional tunnel is sent from the second node to the first node, and then a second unidirectional tunnel is established from the second node to the first node according to the path information for establishing the second unidirectional tunnel.

The path information required by the second unidirectional tunnel may be obtained according to the path information of the first unidirectional tunnel. This may be implemented by using multiple methods according to the actual condition. For example, the egress node of the first unidirectional tunnel is used as the ingress node of the second unidirectional tunnel, and the egress node of the first unidirectional tunnel and the ingress node of the second unidirectional tunnel are the second node. The ingress node of the first unidirectional tunnel is used as the egress node of the second unidirectional tunnel, and the ingress node of the first unidirectional tunnel and the egress node of the second unidirectional tunnel are the first node. In this way, it can be guaranteed that the end points of the first unidirectional tunnel and the second unidirectional tunnel are the same.

Optionally, if nodes of the first unidirectional tunnel include intermediate nodes besides the ingress node (the first node) and the egress node (the second node), and the first path information sent through the first unidirectional tunnel further includes intermediate path information, the reverse path of the intermediate path of the first unidirectional tunnel may be used as the intermediate path of the second unidirectional tunnel when the path information for establishing the unidirectional second tunnel is obtained according to the path information of the first unidirectional tunnel. That is, the nodes covered by the intermediate path of the first unidirectional tunnel are the same as those covered by the intermediate path of the second unidirectional tunnel. This can guarantee that the nodes of the first unidirectional tunnel are the same as the nodes of the second unidirectional tunnel, thus forming a bidirectional tunnel with fully overlapped paths. Certainly, the reverse path of the intermediate path of the first unidirectional tunnel may be used as an excluded path of the intermediate path of the second unidirectional tunnel, thus forming a bidirectional tunnel with non-overlapped paths.

When the reverse path of the intermediate path of the first unidirectional tunnel is used as an excluded path of the intermediate path of the second unidirectional tunnel, the following two cases are included.

Case 1: The reverse path of the intermediate path of the first unidirectional tunnel does not overlap the intermediate path of the second unidirectional tunnel. That is, except the ingress node and the egress node, none of the nodes covered by the intermediate paths of the first unidirectional tunnel is the same as any of the nodes covered by the intermediate paths of the second unidirectional tunnel.

Case 2: The reverse path of the intermediate path of the first tunnel partially overlaps the intermediate path of the second unidirectional tunnel. That is, except the ingress node and the egress node, some of the nodes covered by the intermediate path of the first unidirectional tunnel are the same as some of the nodes covered by the intermediate path of the second unidirectional tunnel.

Step 230: Bind the second unidirectional tunnel to the first unidirectional tunnel as the reverse tunnel of the first unidirectional tunnel.

For example, the second unidirectional tunnel is bound to the first unidirectional tunnel as the reverse tunnel of the first unidirectional tunnel at the first node and the second node that are used as the end points of the tunnel.

In addition, multiple forward tunnels may be bound to a reverse tunnel. For example, after the first unidirectional tunnel is established, a third unidirectional tunnel (the path of the third unidirectional tunnel partially overlaps the path of the first unidirectional tunnel) is established from the first node to the second node, and an instruction for establishing the reverse tunnel of the third unidirectional tunnel is sent during the establishment of the third unidirectional tunnel. After the instruction for establishing the reverse tunnel of the third unidirectional tunnel is sent to the second node, if the established second unidirectional tunnel meets the requirements (for example, the tunnel bandwidth requirement) of the reverse tunnel of the third unidirectional tunnel, the second unidirectional tunnel may be bound to the third unidirectional tunnel as the reverse tunnel of the third unidirectional tunnel.

Embodiment 2

Figure 3:
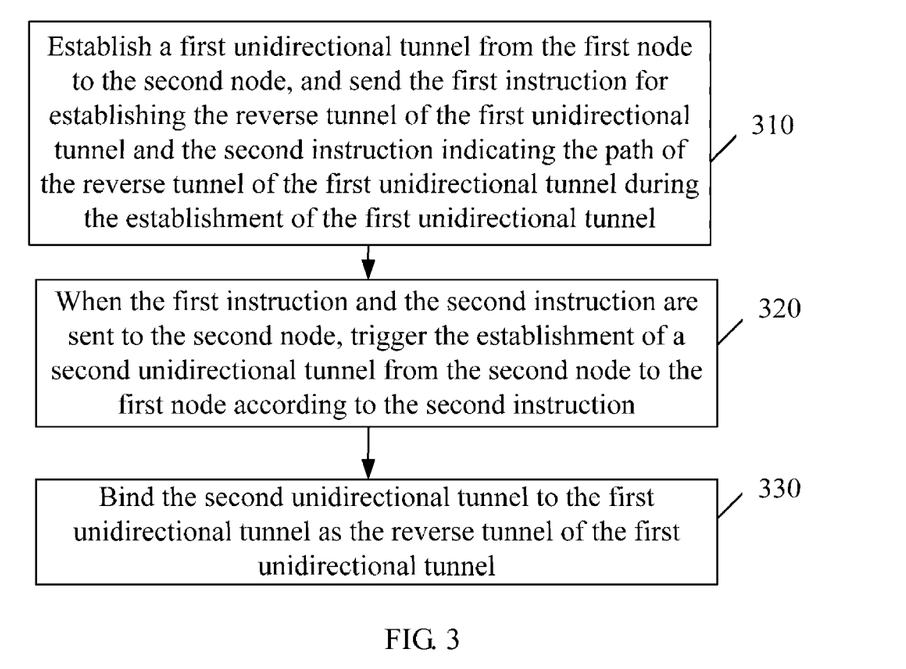
FIG. 3 is a flowchart of a method for establishing tunnels in Embodiment 2 of the present disclosure.

FIG. 3 is a flowchart of a method for establishing tunnels in Embodiment 2 of the present disclosure. Different from Embodiment 1, in Embodiment 2 a second instruction indicating a path of the reverse tunnel of the first unidirectional tunnel and the first instruction are sent during the establishment of the first unidirectional tunnel, and the reverse tunnel of the first unidirectional tunnel is established according to the second instruction. As shown in FIG. 2, the method for establishing tunnels in the embodiment 2 of the present disclosure includes the following steps.

Step 310: Establish a first unidirectional tunnel from the first node to the second node, and send the first instruction for establishing the reverse tunnel of the first unidirectional tunnel and a second instruction indicating the path of the reverse tunnel of the first unidirectional tunnel during the establishment of the first unidirectional tunnel.

The content of the first instruction is the same as that described in Embodiment 1, and thus is not described again. The purpose of sending the second instruction is to constrain the path of the reverse tunnel and ensure that the reverse tunnel of the first unidirectional tunnel is established according to a predetermined path and meets specific requirements in some scenarios.

Step 320: When the first instruction and the second instruction are sent to the second node, trigger the establishment of a second unidirectional tunnel from the second node to the first node according to the second instruction.

Specifically, when the first instruction is sent to the second node, the second node finds that the second node is the egress node of the first unidirectional tunnel and receives the instruction for establishing the reverse tunnel of the first unidirectional tunnel. Then, the second node triggers the transmission of a second tunnel establishment message to the first node; the second tunnel establishment message carries the path information for establishing the second unidirectional tunnel. Further, during the transmission of the second tunnel establishment message from the second node to the first node, the nodes that the second tunnel establishment message passes through establish a second unidirectional tunnel from the second node to the first node according to the path information for establishing the second unidirectional tunnel.

It may be noted that the path information for establishing the second unidirectional tunnel is obtained according to the received second instruction. Some specific implementation methods are given below.

For example, if the second instruction provides a specific path of the reverse tunnel as follows: the second node→the third node→the fourth node→the first node, the path information for establishing the second tunnel carried in the second tunnel establishment message is as follows: the second node→the third node→the fourth node→the first node.

In another example, the second instruction provides the following path information of the reverse tunnel: the ingress node of the reverse tunnel is the second node, and the egress node of the reverse tunnel is the first node; and the intermediate path between the second node and the first node may be selected freely.

Step 330: Bind the second unidirectional tunnel to the first unidirectional tunnel as the reverse tunnel of the first unidirectional tunnel. This step is similar to step 230 in Embodiment 1, and thus is not further described.

Embodiment 3

Figure 4:
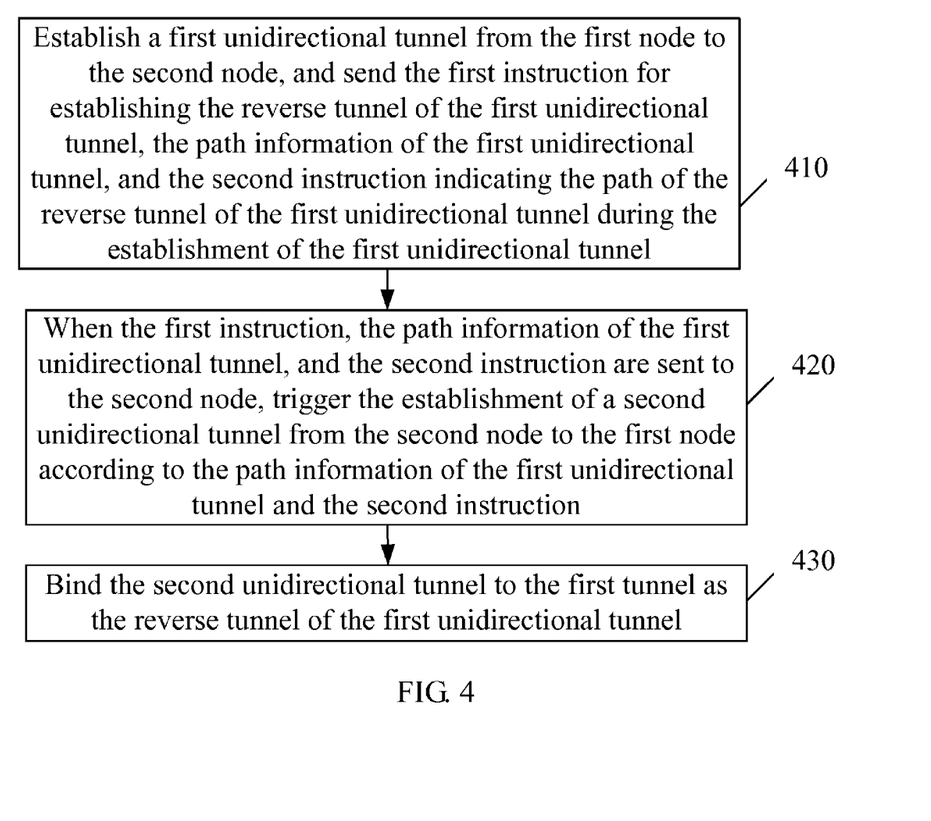
FIG. 4 is a flowchart of a method for establishing tunnels in Embodiment 3 of the present disclosure.

FIG. 4 is a flowchart of a method for establishing tunnels in Embodiment 3 of the present disclosure. Different from Embodiment 2, in Embodiment 3 the first instruction, the path information of the first unidirectional tunnel, and the second instruction are sent during the establishment of the first unidirectional tunnel, and the reverse tunnel of the first unidirectional tunnel is established according to the path information of the first unidirectional tunnel and the second instruction.

Step 410: Establish a first unidirectional tunnel from the first node to the second node, and send the first instruction for establishing the reverse tunnel of the first unidirectional tunnel, the path information of the first unidirectional tunnel, and the second instruction indicating the path of the reverse tunnel of the first unidirectional tunnel during the establishment of the first unidirectional tunnel.

Step 420: When the first instruction, the path information of the first unidirectional tunnel, and the second instruction are sent to the second node, trigger the establishment of a second unidirectional tunnel from the second node to the first node according to the path information of the first unidirectional tunnel and the second instruction.

For example, during the establishment of the first unidirectional tunnel, the first instruction, the second instruction, and the path information (may include the intermediate path information of the first unidirectional tunnel) of the first unidirectional tunnel are sent. The second instruction provides the following path information of the reverse tunnel: the reverse path of the intermediate path of the first unidirectional tunnel is used as the intermediate path of the second unidirectional tunnel. In this case, the nodes covered by the path of the second unidirectional tunnel are the same as those covered by the path of the first unidirectional tunnel.

In another example, the second instruction provides the following path information of the reverse tunnel: the reverse path of the intermediate path of the first unidirectional tunnel is used as the excluded path of the intermediate path of the second unidirectional tunnel. In this case, among the nodes covered by the paths of the second unidirectional tunnel and the first unidirectional tunnel, the intermediate nodes are different except the end points of the tunnels.

Step 430: Bind the second unidirectional tunnel to the first unidirectional tunnel as the reverse tunnel of the first unidirectional tunnel. This step is the same as step 230 in Embodiment 1, and thus is not further described.

Embodiment 4

Figure 5A:
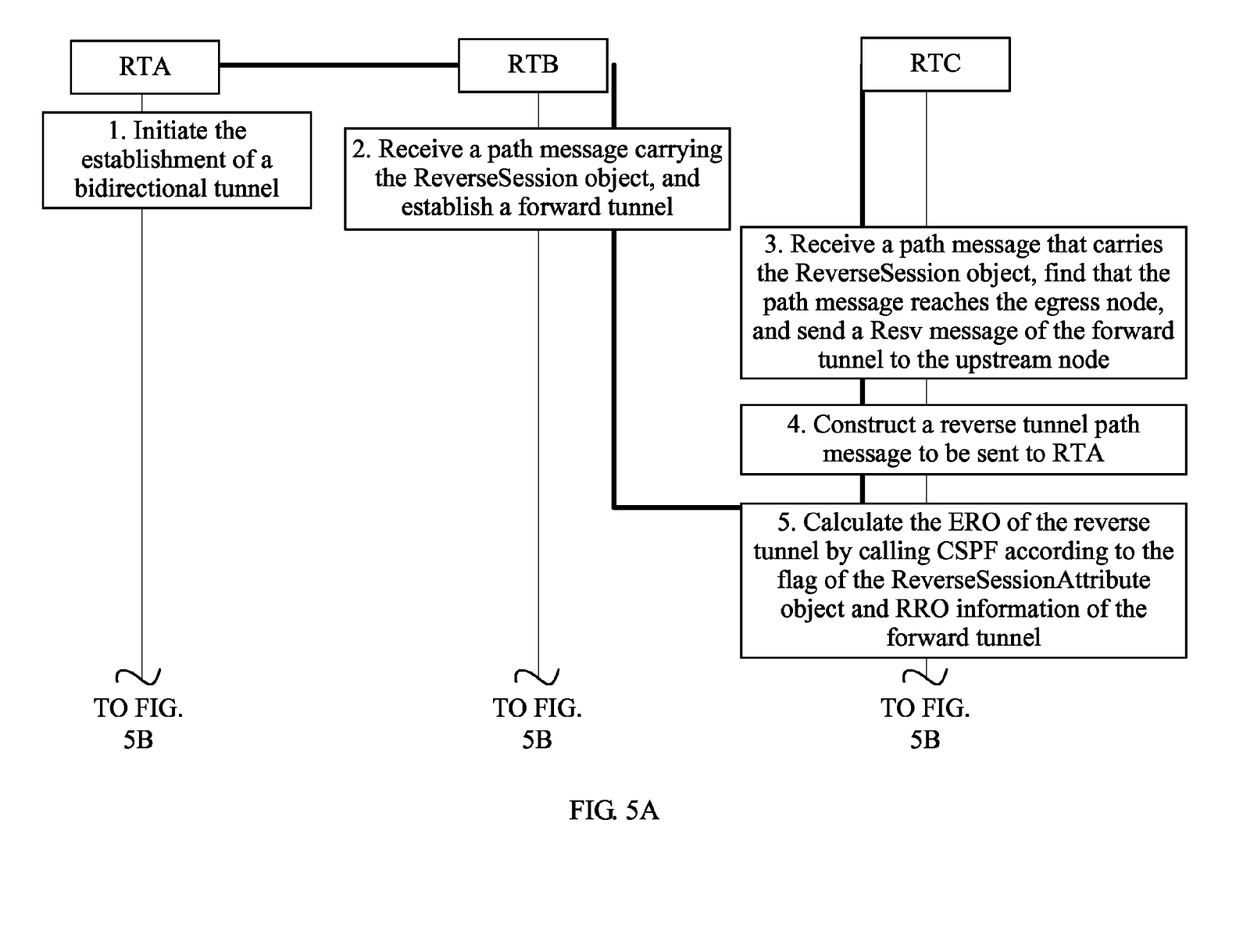
FIG. 5 is a flowchart of a method for establishing tunnels in Embodiment 4 of the present disclosure.
Figure 5B:
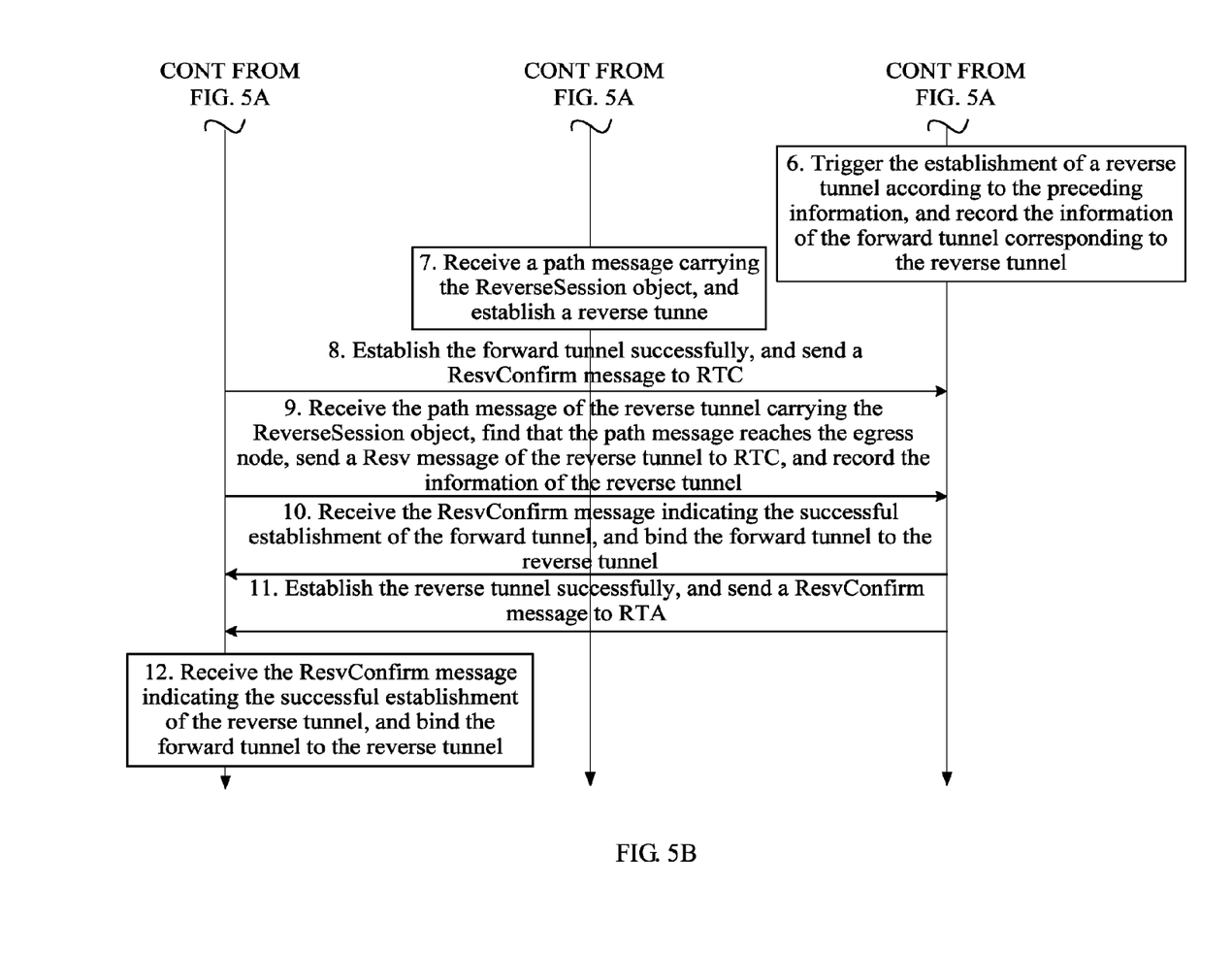

For better description of the preceding embodiment of the present disclosure, the following describes a specific implementation method of the preceding embodiment. FIG. 5 is a flowchart of a method for establishing tunnels in Embodiment 4 of the present disclosure. Embodiment 4 takes the establishment of a Multi Protocol Label Switching (MPLS) Traffic Engineering (TE) bidirectional tunnel as an example.

1. Router A (RTA) initiates the establishment of a bidirectional tunnel.

For example, RTA sends an RSVP-TE Path message (for better description, the path message sent in case of establishment of a forward tunnel is hereinafter referred to as the first establishment message) to RTC through RTB, where the RSVP-TE Path message carries Session and SessionAttribute of the current protocol standard and two new objects (Reverse Session and ReverseSession Attribute).

The content of the ReverseSession object is same as the content of the Session object. For example, the Reverse Session object is defined as follows:

The tunnel end point address (the destination address of the tunnel) of the Internet Protocol version 4 (IPv4) is the RTC address of the egress node RTC of the first tunnel. The Tunnel ID is a tunnel ID allocated to the first tunnel by the ingress node RTA of the first tunnel. The Extended Tunnel ID is the RTA address of the ingress node RTA of the first tunnel.

The content in the ReverseSessionAttribute object may specify the requirement for the reverse tunnel. For example, the ReverseSessionAttribute object is defined as follows:

```
0                 1                 2                 3
+-------------+-------------+-------------+-------------+-------------+-------------+
|   Length    |         Class-Num         |   C-Type    |
+-------------+-------------+-------------+-------------+-------------+-------------+
| Setup Prio  |  Hold Prio  |         Reserved          |    Flags    |
+-------------+-------------+-------------+-------------+-------------+-------------+
|                         Bandwidth                                   |
+-------------+-------------+-------------+-------------+-------------+-------------+
|                         Include-any                                 |
+-------------+-------------+-------------+-------------+-------------+-------------+
|                         Exclude-any                                 |
+-------------+-------------+-------------+-------------+-------------+-------------+
|                         Include-all                                 |
+-------------+-------------+-------------+-------------+-------------+-------------+
```

The Flags indicate the path information of the reverse tunnel or other information about the reverse tunnel, examples of which are provided below.

The 0x00 bit flag may indicate that the path of the reverse tunnel corresponds to the path of the forward tunnel in turn. For example, if the path of the forward tunnel is RTA-RTB-RTC, the path of the reverse tunnel must be RTC-RTB-RTA.

The 0x01 bit flag may indicate that the path of the reverse tunnel does not correspond to the path of the forward tunnel (except the nodes at both ends of the tunnel). For example, if the path of the forward tunnel is RTA-RTB-RTC, the path of the reverse tunnel must be RTC—a node other than RTB-RTA.

The 0x02 bit flag may indicate that the path of the reverse tunnel (except the nodes at both ends of the tunnel) may be selected freely. For example, if the path of the forward tunnel is RTA-RTB-RTC, the ingress node of the reverse tunnel is RTC, the egress node is RTA, and the node between RTC and RTA is not limited.

The 0x04 bit flag may indicate that the information of the reverse tunnel undergoes the flooding of the Interior Gateway Protocol (IGP)-shortcut.

The 0x08 bit flag may indicate that the information of the reverse tunnel undergoes the flooding of the Forwarding-Adjacency.

The 0x10 bit flag may indicate that the reverse tunnel undergoes hot standby class end-to-end protection.

The Setup Priority may indicate the setup priority of the reverse tunnel. It may range from 0 to 7, with 0 indicating the highest priority. The Holding Priority may indicate the holding priority of the reverse tunnel. It may range from 0 to 7, with 0 indicating the highest priority. The Bandwidth may indicate the bandwidth information of the reverse tunnel.

Because the content of the new ReverseSessionAttribute object is similar to the content of the SessionAttribute object of the current protocol standard (the ReverseSessionAttribute object describes the session attribute of the reverse tunnel, while the SessionAttribute object describes the session attribute information of the forward tunnel), these attributes are not further described.

2. RTB receives a first establishment message (carrying the path message of the ReverseSession object) sent from RTA, and establishes a forward tunnel (equivalent to the first tunnel in Embodiment 1).

3. RTC receives a first establishment message sent from RTB, and finds that the first establishment message already reaches the egress node of the forward tunnel. Then, RTC sends a reservation (Resv) message of the forward tunnel to the upstream node (that is, RTA).

4. After finding that the first establishment message carries the ReverseSession object and that the content of the ReverseSession object is the same as the content of the Session object, RTC initiates the establishment of a reverse tunnel (equivalent to the second tunnel in Embodiment 1), and constructs a path message of the reverse tunnel (hereinafter referred to as the second tunnel establishment message) to be sent to RTA.

The content of the Session object carried in the second tunnel establishment message may come from the content of the ReverseSession object carried in the first establishment message, but the contents of the Session object and the ReverseSession object are basically contrary. For example, the tunnel end point address of the Session object in the second tunnel establishment message is the RTA address (that is, the Extended Tunnel ID of the ReverseSession object in the first establishment message). The Extended Tunnel ID in the second tunnel establishment message is the RTA address (that is, the tunnel end point address of the ReverseSession object in the first establishment message).

The information such as resource affinity (RA) and bandwidth in the SessionAttribute object carried in the second tunnel establishment message comes from the ReverseSessionAttribute object carried in the path information of the forward tunnel.

The content of the ReverseSession object carried in the second tunnel establishment message is the same as the content of the Session object carried in the first establishment message.

The content of the ReverseSessionAttribute object carried in the second tunnel establishment message is the same as the content of the SessionAttribute object carried in the first establishment message.

5. RTC calculates an Explicit Route Object (ERO, indicating the path that the second tunnel establishment message must go through) by invoke Constrained Shortest Path First (CSPF) according to the flag of the ReverseSessionAttribute object carried in the first establishment message and the Record Route Object (RRO, recording the path that the message already passes through) in the first establishment message.

6. Trigger the establishment of a reverse tunnel according to the preceding information. Specifically, RTC sends the second tunnel establishment message that carries the Session object, the SessionAttribute object, the ReverseSession object, and the ReverseSessionAttribute object in step 4 and the ERO in step 5 to RTA. In addition, RTC records the information of the forward tunnel corresponding to the reverse tunnel.

7. RTB receives the second tunnel establishment message from RTC, and establishes a reverse tunnel according to the content in the second tunnel establishment message.

8. After receiving the Resv message from RTC, RTA sends a ResvConfirm message indicating the successful establishment of the forward tunnel to RTC.

9. After receiving the second tunnel establishment message from RTC, RTA finds that the node is the egress node of the reverse tunnel. Then, RTA sends a Resv message of the reverse tunnel to RTC. In addition, RTA records the reverse tunnel information in the second tunnel establishment message. According to the preceding description, the reverse tunnel information in the second tunnel establishment message (that is, the path message of reverse tunnel) refers to the content in the ReverseSession object. The content of the ReverseSession object in the second tunnel establishment message, however, is exactly the content of the Session object in the first establishment message (that is, the path message of the forward tunnel).

10. After receiving the ResvConfirm message indicating the successful establishment of the forward tunnel from RTA, RTC binds the forward tunnel to the reverse tunnel.

11. After receiving the Resv message of the reverse tunnel from RTA, RTC sends a ResvConfirm message indicating the successful establishment of the reverse tunnel to RTA.

12. After receiving the ResvConfirm message indicating the successful establishment of the reverse tunnel from RTC, RTA binds the forward tunnel to the reverse tunnel.

After the forward tunnel is established, details on how to hold and process the soft state of the forward tunnel may be found in the prior art, for example, Request for Comments (RFC) 2205 and RFC 3209. Details on how to hold and process the soft state of the reverse tunnel may also be referred to RFC 2205 and RFC 3209. The forward tunnel refresh message is used to maintain the forward tunnel, and the reverse tunnel refresh message is used to maintain the reverse tunnel. If the reverse tunnel needs to be removed, the removal of the reverse tunnel does not affect the forward tunnel. If the reverse tunnel is down, the forward tunnel may re-trigger the establishment of a reverse tunnel.

According to the preceding implementation method, the reverse tunnel establishment process depends on whether the ReverseSession object exists in the received path message and whether the content of the Reverse Session object is the same as the content of the Session object. The details are as follows.

If the path message received by the egress node of the tunnel does not include the ReverseSession object, the first establishment message is processed normally [refer to RFC 2209 and RFC 3209].

If the path message received by the egress node of the tunnel includes the ReverseSession object and the ReverseSession object includes the contents same as those of the Session object in the path message, it indicates that the path message is the path message of the forward tunnel. Then, the reverse tunnel establishment process is triggered.

If the path message received by the egress node of the tunnel includes the ReverseSession object but the ReverseSession object includes contents different from those of the Session object carried in the path message, it indicates that the path message is a path message of the reverse tunnel. Then, the reverse tunnel establishment process is not triggered, thus avoiding repeated establishment of the reverse tunnel.

The following describes several alternative methods of the preceding implementation methods. Firstly, whether the establishment of the reverse tunnel is triggered may not depend on whether the path message includes the ReverseSession object and whether the contents of the ReverseSession object are the same as those of the Session. Instead, a flag indicating that a reverse tunnel is to be established in the forward tunnel path message may be sent to the egress node of the forward tunnel. When the egress node of the forward tunnel triggers the reverse tunnel path message, it is allowed to delete or change the flag indicating that a reverse tunnel is to be established in the reverse tunnel path message, so as to inform the egress node of the reverse tunnel (that is, the ingress node of the forward tunnel) of the information that a reverse tunnel does not need to be established for the reverse tunnel when a reverse tunnel is established. In this way, the establishment of the reverse tunnel may not be repeated.

Secondly, the ReverseSessionAttribute object may not be carried in the path message of a forward tunnel. For example, various attributes of the reverse tunnel may be set to default values in advance according to the actual requirements. Thus, when it is necessary to establish a reverse tunnel, the reverse tunnel may be established according to the preset default standard.

Embodiment 5

Figure 6:
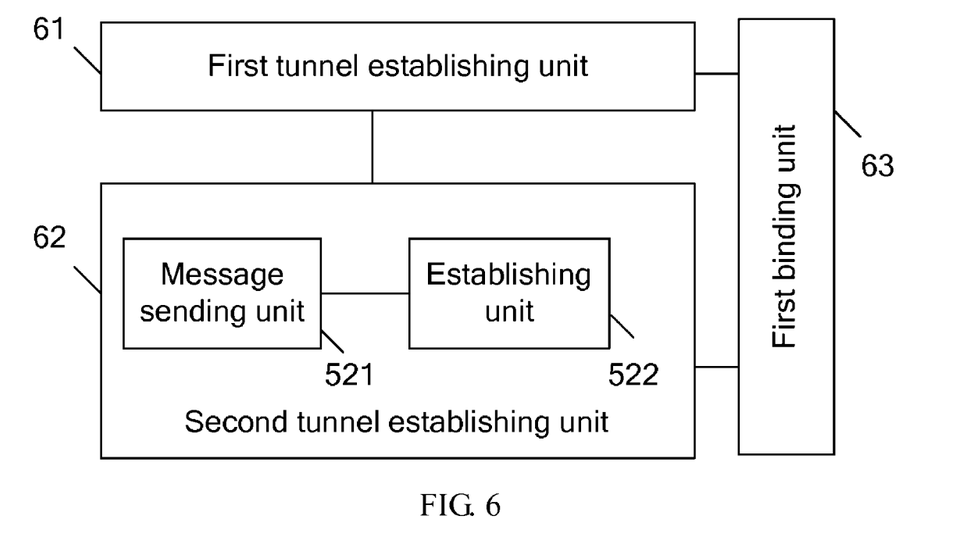
FIG. 6 shows a logical structure of a system for establishing tunnels in Embodiment 5 of the present disclosure.

FIG. 6 shows a logical structure of a system for establishing tunnels in Embodiment 5 of the present disclosure. Because the tunnel establishment process involves multiple nodes, these nodes may be combined to implement the function of each unit shown in FIG. 6. The system includes a first tunnel establishing unit 61, a second tunnel establishing unit 62, and a first binding unit 63.

The first tunnel establishing unit 61 is configured to establish a first unidirectional tunnel from a first node to a second node, and send a first instruction for establishing a reverse tunnel of the first unidirectional tunnel during the establishment of the first unidirectional tunnel. Optionally, the first tunnel establishing unit 61 may send the path information of the first tunnel and/or a second instruction indicating the path of the reverse tunnel of the first unidirectional tunnel while sending the first instruction. The first instruction, the path information of the first unidirectional tunnel, and the second instruction are already described in the preceding sections, and are not further described. Although the ingress node of the first unidirectional tunnel is the first node and the egress node is the second node, intermediate nodes may exist between the ingress node and the egress node. Different from the prior art, the first tunnel establishing unit 61 sends the first instruction and the second instruction. Thus, details on how to establish the first unidirectional tunnel may be found in the prior art, and are not further described.

The second tunnel establishing unit 62 is configured to trigger the establishment of a second unidirectional tunnel from the second node to the first node when the instruction for establishing the reverse tunnel of the first unidirectional tunnel is sent to the second node. The second tunnel establishing unit 62 may adopt multiple implementation methods due to the first tunnel establishing unit 61 adopts different implementation methods.

For example, the first tunnel establishing unit 61 sends the first instruction and the path information of the first unidirectional tunnel during the establishment of the first unidirectional tunnel. In this way, the second tunnel establishing unit 62 may be configured to trigger the establishment of a second unidirectional tunnel from the second node to the first node according to the path information of the first unidirectional tunnel when the first instruction and the path information of the first unidirectional tunnel are sent to the second node. The method for establishing a second unidirectional tunnel from the second node to the first node according to the path information of the first unidirectional tunnel is already described in the preceding embodiments, and thus is not further described.

In another example, the first tunnel establishing unit 61 sends the first instruction and the second instruction during the establishment of the first unidirectional tunnel. In this way, the second tunnel establishing unit 62 may be configured to trigger the establishment of a second unidirectional tunnel from the second node to the first node according to the second instruction when the first instruction and the second instruction are sent to the second node. The method for establishing a second unidirectional tunnel from the second node to the first node according to the second instruction is already described in the preceding embodiments, and thus is not further described.

In another example, the first tunnel establishing unit 61 sends the first instruction, the path information of the first unidirectional tunnel, and the second instruction during the establishment of the first unidirectional tunnel. In this way, the second tunnel establishing unit 62 may be configured to trigger the establishment of a second unidirectional tunnel from the second node to the first node according to the path information of the first unidirectional tunnel and the second instruction when the first instruction, the path information of the first tunnel, and the second instruction are sent to the second node. The method for establishing a second unidirectional tunnel from the second node to the first node according to the path information of the first unidirectional tunnel and the second instruction is already described in the preceding embodiments, and thus is not further described.

The following describes a specific structure of the second tunnel establishing unit 62. The second tunnel establishing unit 62 includes a message sending unit 521 and an establishing unit 522. The message sending unit 521 is configured to: when the first instruction is sent to the second node, send a second tunnel establishment message that carries the path information for establishing the second unidirectional tunnel from the second node to the first node.

The establishing unit 522 is configured to establish a second unidirectional tunnel from the second node to the first node according to the path information for establishing the second unidirectional tunnel. Similar to the second tunnel establishing unit 62 that may adopt multiple methods to establish the second unidirectional tunnel, the message sending unit 521 in the second tunnel establishing unit 62 may adopt multiple implementation methods.

For example, the first tunnel establishing unit 61 sends the first instruction and the path information of the first unidirectional tunnel during the establishment of the first unidirectional tunnel, and the message sending unit 521 includes a path obtaining unit and a constructing-and-sending unit. The path obtaining unit is configured to obtain the path information for establishing the second unidirectional tunnel according to the path information of the first unidirectional tunnel when the first instruction and the path information of the first unidirectional tunnel are sent to the second node. The constructing-and-sending unit is configured to construct a second tunnel establishment message that carries the path information for establishing the second unidirectional tunnel, and send the second tunnel establishment message from the second node to the first node.

In another example, the first tunnel establishing unit 61 sends the first instruction and the second instruction during the establishment of the first unidirectional tunnel, and the message sending unit 521 includes a path obtaining unit and a constructing-and-sending unit. The path obtaining unit is configured to obtain the path information for establishing the second unidirectional tunnel according to the second instruction when the first instruction and the second instruction are sent to the second node. The constructing-and-sending unit is configured to: construct a second tunnel establishment message that carries the path information for establishing the second unidirectional tunnel, and send the second tunnel establishment message from the second node to the first node.

In another example, the first tunnel establishing unit 61 sends the first instruction, the path information of the first unidirectional tunnel, and the second instruction during the establishment of the first unidirectional tunnel, and the message sending unit 521 includes a path obtaining unit and a constructing-and-sending unit. The path obtaining unit is configured to obtain the path information for establishing a second unidirectional tunnel according to the path information of the first tunnel and the second instruction when the first instruction, the path information of the first unidirectional tunnel, and the second instruction are sent to the second node. The constructing-and-sending unit is configured to: construct a second tunnel establishment message that carries the path information for establishing the second unidirectional tunnel, and send the second tunnel establishment message from the second node to the first node.

According to the preceding description, the second tunnel establishing unit 62 may adopt multiple implementation methods. Accordingly, the second tunnel establishing unit 62 may establish multiple paths of the second unidirectional tunnel. Because the end point of the second unidirectional tunnel is the same as that of the first unidirectional tunnel, the change of the path of the second unidirectional tunnel is reflected by the change of the intermediate path between the end points of the tunnel. For example, the nodes covered by the intermediate path of the second unidirectional tunnel are the same as those covered by the intermediate path of the first unidirectional tunnel. In this case, the intermediate path of the second unidirectional tunnel is the reverse path of the intermediate path of the first unidirectional tunnel, thus ensuring that the first unidirectional tunnel and the second unidirectional tunnel pass through the same nodes. In another example, the nodes covered by the intermediate path of the second unidirectional tunnel are different from those covered by the intermediate path of the first unidirectional tunnel. In another example, some of the nodes covered by the intermediate path of the second unidirectional tunnel are the same as those covered by the intermediate path of the first unidirectional tunnel.

After the second tunnel establishing unit 62 establishes the second unidirectional tunnel successfully, the first binding unit 63 is configured to bind the second unidirectional tunnel to the first unidirectional tunnel as the reverse tunnel of the first unidirectional tunnel. Generally, the end points (that is, the first node and the second node) of the first unidirectional tunnel and the second unidirectional tunnel bind the first unidirectional tunnel to the second unidirectional tunnel.

In some scenarios, more than two forward tunnels with different paths and same direction may be established between two nodes. For example, if another tunnel (hereinafter referred to as the third unidirectional tunnel) is established from the first node to the second node and a reverse tunnel of the third unidirectional tunnel needs to be established, the second unidirectional tunnel may be bound to the third unidirectional tunnel as the reverse tunnel of the third unidirectional tunnel if the reverse tunnel of the third unidirectional tunnel has no attribute requirement such as bandwidth requirement, or the second unidirectional tunnel can meet the attribute requirement of the reverse tunnel of the third unidirectional tunnel.

For example, the system provided in this embodiment further includes a third tunnel establishing unit configured to establish a third unidirectional tunnel from the first node to the second node, and send an instruction for establishing the reverse tunnel of the third unidirectional tunnel during the establishment of the third unidirectional tunnel, and a third binding unit, configured to bind the second unidirectional tunnel to the third unidirectional tunnel as the reverse tunnel of the third unidirectional tunnel after the instruction for establishing the reverse tunnel of the third unidirectional tunnel is sent to the second node.

In this example, the second tunnel may be used as the reverse tunnel of the first unidirectional tunnel, and the second unidirectional tunnel may be used as the reverse tunnel of the third unidirectional tunnel, thus saving the tunnel establishment resources. In addition, multiple forward tunnels may be bound to one reverse tunnel.

According to the preceding embodiments of the present disclosure and implementation methods, an instruction for establishing the reverse tunnel is sent during the establishment of a forward tunnel. When the instruction reaches the egress node of the forward tunnel, the establishment of reverse tunnel is triggered, and a bidirectional tunnel is automatically established. Because the bidirectional tunnel can be automatically established, the applicability of the tunnel technology is enhanced. For example, a tunnel and a multicast service may be deployed on a same network. In another example, because the bidirectional tunnel ensures that the forward tunnel and the reverse tunnel pass through the same nodes, Bidirectional Forwarding Detection (BFD) may be used to detect link failures. On the contrary, if only a unidirectional tunnel is deployed on the network, for example, if only a BFD for Resource Reservation Protocol (RSVP)-TE Label Switched Path (LSP) is deployed, the forward BFD packet is forwarded according to the RSVP-TE LSP when the RSVP-TE LSP connectivity is detected through BFD. However, because the current TE tunnel is unidirectional, the reverse BFD packet may be forwarded according to the IP address. In this way, it cannot be guaranteed that the forward path and the reverse path of the BFD packet are the same, thus bringing about an unreliable BFD result.

Although the disclosure has been described through exemplary embodiments, the disclosure is not limited to such embodiments. It is apparent that those skilled in the art can make various modifications and variations to the disclosure without departing from the scope of the disclosure. The disclosure is intended to cover the modifications and variations provided that they fall within the scope of protection defined by the claims or their equivalents.

What is claimed is:

1. A method for establishing tunnels, the method comprising:
    establishing, by a processor, a first unidirectional tunnel from a first node to a second node, and sending a first instruction for establishing a reverse tunnel of the first unidirectional tunnel;
    when sending the first instruction to the second node, triggering establishment of a second unidirectional tunnel from the second node to the first node; and
    binding the second unidirectional tunnel as the reverse tunnel of the first unidirectional tunnel, wherein the second unidirectional tunnel includes an intermediate path that is excluded from the first unidirectional tunnel such that the second unidirectional tunnel does not completely overlap with the first unidirectional tunnel.

2. The method of claim 1, further comprising sending path information of the first unidirectional tunnel, wherein the step of establishing the second unidirectional tunnel comprises:
    establishing the second unidirectional tunnel from the second node to the first node according to the path information of the first unidirectional tunnel.

3. The method of claim 1, further comprising sending a second instruction indicating the path of the reverse tunnel of the first unidirectional tunnel, wherein the step of establishing the second unidirectional tunnel comprises:
    establishing the second unidirectional tunnel from the second node to the first node according to the second instruction.

4. The method of claim 1, further comprising sending path information of the first unidirectional tunnel and a second instruction indicating the path of the reverse tunnel of the first unidirectional tunnel, wherein the step of establishing the second unidirectional tunnel comprises:
    establishing the second unidirectional tunnel from the second node to the first node according to the path information of the first unidirectional tunnel and the second instruction.

5. The method of claim 1, wherein when sending the first instruction to the second node, the step of establishing the second unidirectional tunnel comprises:
    when sending the first instruction to the second node, sending a second tunnel establishment message that carries path information for establishing the second unidirectional tunnel from the second node to the first node; and
    establishing the second unidirectional tunnel from the second node to the first node according to the path information for establishing the second unidirectional tunnel.

6. The method of claim 5, wherein the path information for establishing the second unidirectional tunnel is obtained in any one of the following modes:
    sending path information of the first unidirectional tunnel during the establishment of the first unidirectional tunnel, and obtaining the path information for establishing the second unidirectional tunnel according to the path information of the first unidirectional tunnel;
    sending a second instruction indicating the path of the reverse tunnel of the second unidirectional tunnel during the establishment of the first unidirectional tunnel, and obtaining the path information for establishing the second unidirectional tunnel according to the second instruction; and
    sending the path information of the first unidirectional tunnel and the second instruction indicating the path of the reverse tunnel of the first unidirectional tunnel during the establishment of the first unidirectional tunnel, and obtaining the path information for establishing the second unidirectional tunnel according to the path information of the first unidirectional tunnel and the second instruction.

7. The method of claim 1, wherein:
    intermediate nodes covered by the first unidirectional tunnel are excluded from the second unidirectional tunnel such that no intermediate paths of the second unidirectional tunnel overlap with the first unidirectional tunnel.

8. A method for establishing tunnels, the method comprising:
    establishing, by a processor, a first unidirectional tunnel from a first node to a second node, and sending a first instruction for establishing a reverse tunnel of the first unidirectional tunnel;
    triggering establishment of a second unidirectional tunnel from the second node to the first node;
    establishing a third unidirectional tunnel from the first node to the second node, and
    binding the second unidirectional tunnel to both the first unidirectional tunnel and the third unidirectional tunnel, thereby causing the second unidirectional tunnel to serve as a reverse tunnel for both the first unidirectional tunnel and the third unidirectional tunnel.

9. The method of claim 8, wherein each of the first unidirectional tunnel, the second unidirectional tunnel, and the third unidirectional tunnel are traffic engineered (TE) tunnels, and wherein the second unidirectional tunnel includes an intermediate path that is excluded from each of the first unidirectional tunnel and the third unidirectional tunnel such that neither the first unidirectional tunnel nor the third unidirectional tunnel completely overlap with the second unidirectional tunnel.

10. An apparatus system for establishing tunnels, the apparatus comprising:

a first tunnel establishing unit configured to establish a first unidirectional tunnel from a first node to a second node, and send a first instruction for establishing a reverse tunnel of the first unidirectional tunnel;

a second tunnel establishing unit configured to trigger establishment of a second unidirectional tunnel from the second node to the first node when the instruction for establishing the reverse tunnel of the first unidirectional tunnel is sent to the second node; and a first binding unit, configured to bind the second unidirectional tunnel to the first unidirectional tunnel as the reverse tunnel of the first unidirectional tunnel, wherein the second unidirectional tunnel includes an intermediate path that is excluded from the first unidirectional tunnel such that the second unidirectional tunnel does not completely overlap with the first unidirectional tunnel.

11. The apparatus of claim 10, wherein:

the first tunnel establishing unit is further configured to send a second instruction indicating the path of the reverse tunnel of the first unidirectional tunnel; and when the first instruction and the second instruction are sent to the second node, the second tunnel establishing unit establishes the second unidirectional tunnel from the second node to the first node according to the second instruction.

12. The apparatus of claim 10, wherein:

the first tunnel establishing unit is further configured to send path information of the first unidirectional tunnel and a second instruction indicating the path of the reverse tunnel of the first unidirectional tunnel; and when the first instruction, the path information of the first unidirectional tunnel, and the second instruction are sent to the second node, the second tunnel establishing unit establishes the second unidirectional tunnel from the second node to the first node according to the path information of the first unidirectional tunnel and the second instruction.

13. The apparatus of claim 10, wherein the second tunnel establishing unit comprises:

a message sending unit configured to, when the first instruction is sent to the second node, send a second tunnel establishment message that carries path information for establishing the second unidirectional tunnel from the second node to the first node; and an establishing unit configured to establish the second unidirectional tunnel from the second node to the first node according to the path information for establishing the second unidirectional tunnel.

14. The apparatus of claim 13, wherein the first tunnel establishing unit is further configured to send path information of the first unidirectional tunnel and the message sending unit comprises:

a path obtaining unit configured to obtain the path information for establishing the second unidirectional tunnel according to the path information of the first unidirectional tunnel when the first instruction and the path information of the first unidirectional tunnel are sent to the second node; and a constructing-and-sending unit configured to construct a second tunnel establishment message that comprises the path information for establishing the second unidirectional tunnel, and send the second tunnel establishment message from the second node to the first node.

15. The apparatus of claim 13, wherein the first tunnel establishing unit is further configured to send a second instruction indicating the path of the reverse tunnel of the first unidirectional tunnel and the message sending unit comprises:

a path obtaining unit configured to obtain the path information for establishing the second unidirectional tunnel according to the second instruction when the first instruction and the second instruction are sent to the second node; and a constructing-and-sending unit configured to construct a second tunnel establishment message that comprises the path information for establishing the second unidirectional tunnel, and send the second tunnel establishment message from the second node to the first node.

16. The apparatus of claim 13, wherein the first tunnel establishing unit is further configured to send path information of the first unidirectional tunnel and a second instruction indicating the path of the reverse tunnel of the first unidirectional tunnel and the message sending unit comprises:

a path obtaining unit configured to obtain the path information for establishing the second unidirectional tunnel according to the path information of the first unidirectional tunnel and the second instruction when the first instruction, the path information of the first unidirectional tunnel, and the second instruction are sent to the second node; and a constructing-and-sending unit configured to construct a second tunnel establishment message that comprises the path information for establishing the second unidirectional tunnel, and send the second tunnel establishment message from the second node to the first node.

17. The apparatus of claim 10, wherein:

the nodes covered by an intermediate path of the second unidirectional tunnel are different from those covered by an intermediate path of the first unidirectional tunnel.

18. The apparatus of claim 10, further comprising:

a third unidirectional tunnel establishing unit configured to establish a third unidirectional tunnel from the first node to the second node, and send a third instruction for establishing a reverse tunnel of the third unidirectional tunnel during the establishment of the third unidirectional tunnel; and a third binding unit configured to bind the second unidirectional tunnel to the third unidirectional tunnel as the reverse tunnel of the third unidirectional tunnel after the third instruction for establishing the reverse tunnel of the third unidirectional tunnel is sent to the second node.

19. The apparatus of claim 10, wherein the first unidirectional tunnel and the second unidirectional tunnel are traffic engineered (TE) tunnels.

20. The apparatus of claim 10, wherein:

the first tunnel establishing unit is further configured to send path information of the first unidirectional tunnel; and when the first instruction and the path information of the first unidirectional tunnel are sent to the second node, the second tunnel establishing unit establishes the second unidirectional tunnel from the second node to the first node according to the path information of the first unidirectional tunnel.

\* \* \* \* \*

UNITED STATES PATENT AND TRADEMARK OFFICE
CERTIFICATE OF CORRECTION

PATENT NO. : 8,472,450 B2
APPLICATION NO. : 12/904484
DATED : June 25, 2013
INVENTOR(S) : Li et al.

It is certified that error appears in the above-identified patent and that said Letters Patent is hereby corrected as shown below:

In the Claims:

In Col. 15, Line 13, Claim 10, after "An apparatus" delete "system".

Signed and Sealed this
Thirtieth Day of July, 2013

Teresa Stanek Rea
*Acting Director of the United States Patent and Trademark Office*